(12) United States Patent
Lessard

(10) Patent No.: US 9,157,509 B2
(45) Date of Patent: Oct. 13, 2015

(54) DRIVING DEVICE AND CORRESPONDING MILL

(71) Applicant: COMPAGNIE ENGRENAGES ET REDUCTEURS-MESSIAN-DURAND, Cambrai (FR)

(72) Inventor: Fabrice Lessard, Cambrai (FR)

(73) Assignee: Compagnie Engrenages et Reducteurs—Messian—Durand, Cambrai (FR)

( * ) Notice: Subject to any disclaimer, the term of this patent is extended or adjusted under 35 U.S.C. 154(b) by 140 days.

(21) Appl. No.: 13/797,773

(22) Filed: Mar. 12, 2013

(65) Prior Publication Data

US 2013/0239723 A1 Sep. 19, 2013

(30) Foreign Application Priority Data

Mar. 13, 2012 (FR) ...................................... 12 52246

(51) Int. Cl.
*B02C 17/24* (2006.01)
*F16H 1/20* (2006.01)
*F16H 1/22* (2006.01)

(52) U.S. Cl.
CPC *F16H 1/20* (2013.01); *B02C 17/24* (2013.01); *F16H 1/22* (2013.01); *Y10T 74/19684* (2015.01)

(58) Field of Classification Search
CPC .............. B02C 17/24; F16H 1/22; F16H 1/20
USPC ....................................... 241/101.2, 176–178
See application file for complete search history.

(56) References Cited

U.S. PATENT DOCUMENTS

| | | | | | |
|---|---|---|---|---|---|
| 1,711,405 | A | * | 4/1929 | Cole | 384/549 |
| 2,215,766 | A | * | 9/1940 | Reynolds | 241/38 |
| 2,595,509 | A | * | 5/1952 | Brown | 241/98 |
| 2,630,301 | A | * | 3/1953 | Lentz | 366/233 |
| 3,549,094 | A | * | 12/1970 | Kurtz | 241/171 |

(Continued)

FOREIGN PATENT DOCUMENTS

| | | |
|---|---|---|
| DE | 102011009614 A1 | 8/2011 |
| FR | 1401324 A | 6/1965 |

(Continued)

OTHER PUBLICATIONS

French Search Report; French Patent Application No. 1252246; Dated Dec. 10, 2012.

*Primary Examiner* — Faye Francis
(74) *Attorney, Agent, or Firm* — Patterson & Sheridan, LLP

(57) ABSTRACT

The disclosure describes a driving device for a mill including a gear ring, suitable for being fastened to a grinding chamber, a first reduction transmission suitable for transmitting a rotation from a first motor to the gear ring, the reduction transmission comprising a case, an output module including an output pinion and an output shaft defining an output axis. The gear ring has helical teeth, the output pinion has helical teeth, the or each output module can be inserted in a single piece into the associated case in an insertion direction or removed in a single piece from that associated case in a removal direction. The driving device includes a disconnectable connecting element suitable for rotatably connecting the output shaft to a transmission element and allowing, in a disconnected state, a rotation of the output pinion around the output axis upon removal of the output module outside the case or during insertion of the output module into the case.

20 Claims, 8 Drawing Sheets

(56) References Cited

U.S. PATENT DOCUMENTS

| | | | |
|---|---|---|---|
| 3,971,167 A * | 7/1976 | van Moppes | 451/328 |
| 4,482,097 A * | 11/1984 | Stone | 241/101.2 |
| 4,664,322 A * | 5/1987 | Henne et al. | 241/176 |
| 4,762,281 A * | 8/1988 | Eberhardt | 241/46.06 |
| 6,119,969 A * | 9/2000 | Racine | 241/101.2 |
| 6,189,819 B1 * | 2/2001 | Racine | 241/176 |
| 8,162,246 B2 * | 4/2012 | Long et al. | 241/101.2 |
| 8,931,722 B2 * | 1/2015 | Lessard | 241/101.2 |
| 2002/0158157 A1 * | 10/2002 | Hagedorn et al. | 241/101.2 |
| 2003/0052205 A1 * | 3/2003 | Tirschler | 241/32.5 |

FOREIGN PATENT DOCUMENTS

| | | |
|---|---|---|
| WO | 2006/029454 A1 | 3/2006 |
| WO | 2011/083274 A1 | 7/2011 |

* cited by examiner

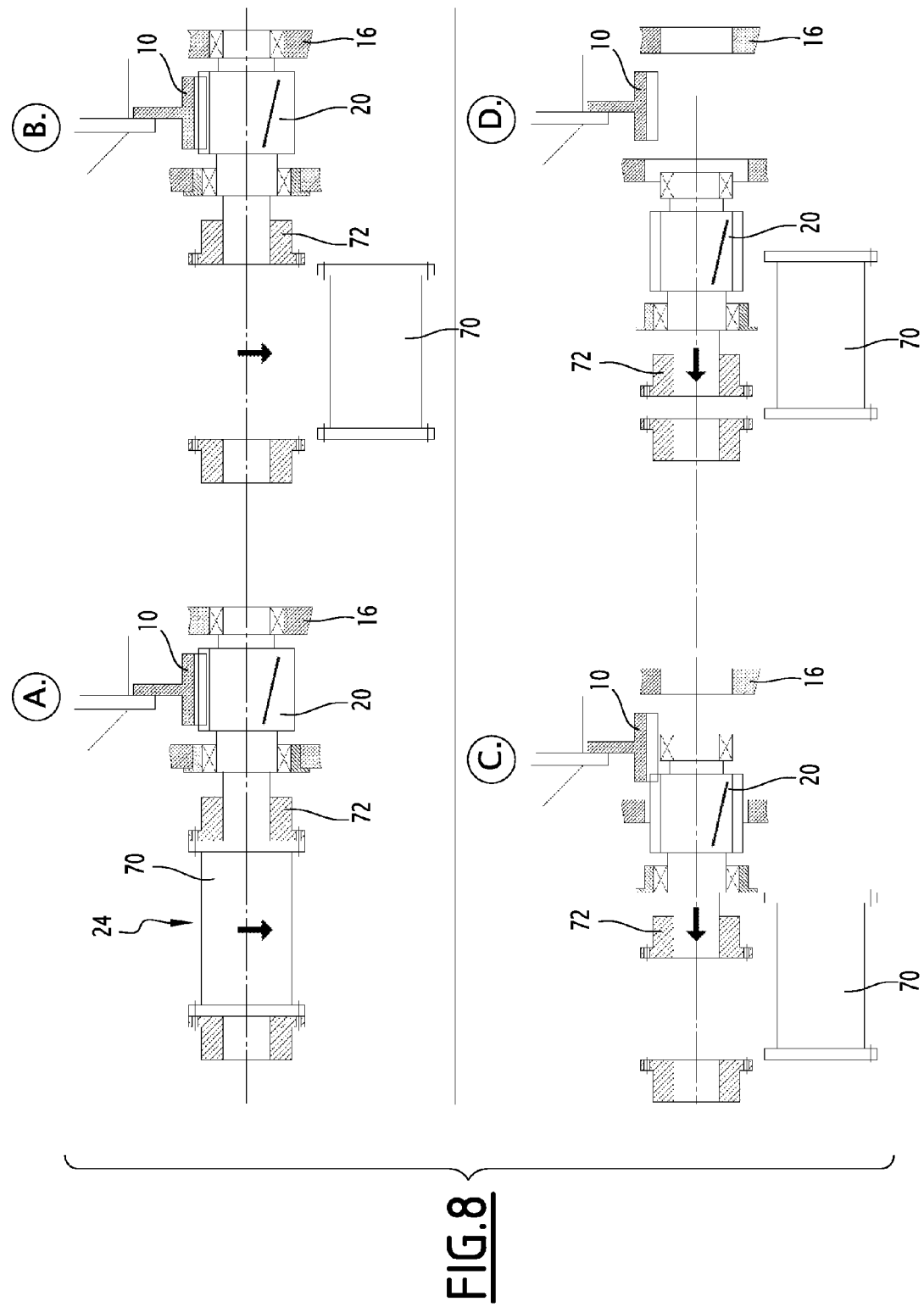

DRIVING DEVICE AND CORRESPONDING MILL

BACKGROUND OF THE INVENTION

1. Field of the Invention

The present invention relates to a driving device for a mill, in particular a horizontal mill comprising: a gear ring suitable for being fastened to a grinding chamber and extending around a ring axis, a first reduction transmission suitable for transmitting a rotation from a first motor to the gear ring, the or each reduction transmission comprising: a case, at least two output modules each including an output pinion and an output shaft defining an output axis, each output pinion meshing with the gear ring.

2. Description of the Related Art

A driving device of this type is known from document WO-2011/083274.

This device comprises a gear ring and an output pinion meshing with the gear ring. The gear ring and the output pinions are provided with spur teeth.

However, driving devices with spur teeth have a number of drawbacks, for example such as limited transmission power for a given size.

The invention therefore aims to increase the transmissible power for a given size, while allowing quick and inexpensive upkeep of the driving device.

SUMMARY OF THE INVENTION

To that end, the invention relates to a driving device of the aforementioned type, characterized in that the gear ring has helical teeth, each output pinion has helical teeth, each output module can be inserted in a single piece into the associated case in an insertion direction or removed in a single piece from that associated case in a removal direction, the insertion direction and the removal direction extending parallel to the output axis, and in that the driving device comprises, for at least one output module, disconnectable connecting means suitable for rotatably connecting the output shaft to a transmission element and allowing, in the disconnected state, a rotation of the output pinion around the output axis upon removal of the output module outside the case or during insertion of the output module into the case.

According to other embodiments, the invention may include one or more of the following features:

the transmission element is an output element arranged on the output shaft, in particular either a toothed output wheel, in particular with helical teeth, or an output flange;

the transmission element is axially fixed on the output shaft when the disconnectable connecting means are in the disconnected state;

each transmission element is a toothed output wheel and either the driving device comprises, for each output module except one, disconnectable connecting means suitable for rotatably connecting the output shaft to the toothed output wheel and allowing, in the disconnected state, a rotation of the output pinion around the output axis during removal of the output module from the case or during insertion of the output module in the case, and the output pinion and the toothed output wheel of the output module that does not include disconnectable connecting means have identical helical pitches, or the driving device comprises, for each output module, disconnectable connecting means suitable for rotatably connecting the output shaft to the toothed output wheel and allowing, in the disconnected state, a rotation of the output pinion around the output axis during removal of the output module from the case or during insertion of the output module in the case, and the output pinion and toothed output wheel have different helical pitches;

the transmission element is an intermediate element, and the disconnectable connecting means comprise a connecting pinion and a toothed connecting wheel, the connecting pinion being movable between a connected position and a disconnected position;

the transmission element is a transmission flange and the disconnectable connecting means comprise a spacer and an output flange fastened to the output shaft, the spacer having an axial length that is at least equal to the axial distance necessary to remove the output module axially from the case, preferably at least the axial length of the output module;

it comprises a first drive motor connected to the first reduction transmission, and the transmission element and the motor are either arranged on two opposite axial sides of the gear ring, or arranged on a same axial side of the gear ring;

it comprises a second reduction transmission and a second drive motor.

The invention also relates to a mill, in particular a horizontal mill, having a grinding chamber and a driving device, characterized in that the driving device is a driving device as defined above.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention will be better understood upon reading the following description, provided solely as an example, and done in reference to the appended drawings, in which:

FIGS. 8A to 8D show the steps of disassembling a driving device according to a fourth alternative of the invention.

DETAILED DESCRIPTION

Figure 1:
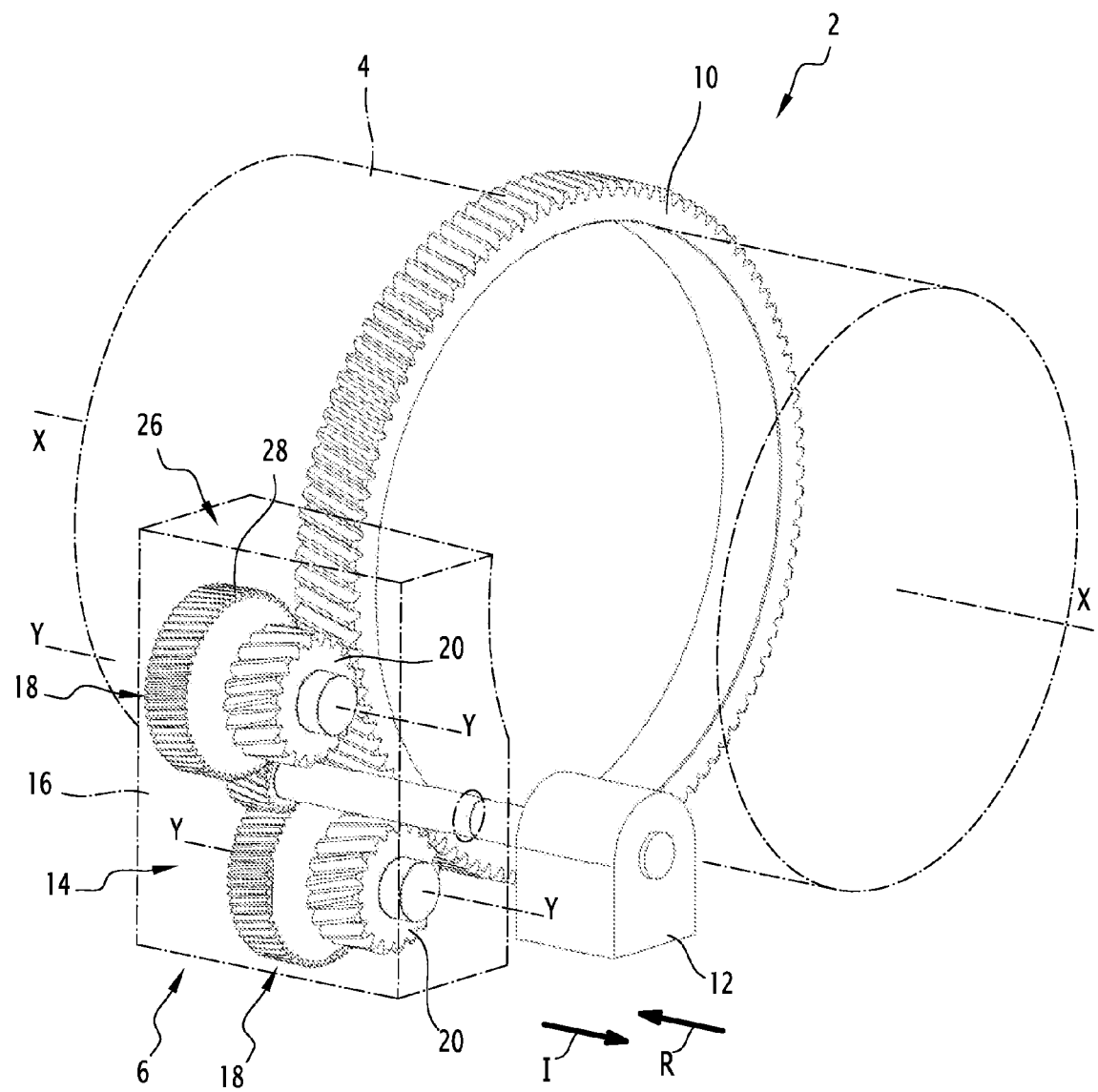
FIG. 1 is a diagrammatic perspective view of a mill according to a first embodiment of the invention.

FIG. 1 shows a horizontal mill according to a first embodiment of the invention, designated by general reference 2. The horizontal mill 2 comprises a grinding chamber 4 and a driving device 6.

The grinding chamber 4 defines a central axis X-X. The central axis X-X is arranged horizontally and the grinding chamber 4 is housed rotating around that central axis X-X on bearings (not shown).

The driving device 6 comprises a gear ring 10 that is fastened to the grinding chamber 4 and extends around a ring axis identical to the central axis X-X. The gear ring comprises helical teeth.

The driving device 6 comprises a first motor 12 and a first reduction transmission 14. The first reduction transmission 14 is suitable for transmitting a rotation from the motor shaft of the first motor 12 to the gear ring 10.

The embodiment of FIG. 1 is provided with a single motor 12 and a single reduction transmission 14 that are suitable for driving the gear ring 10.

The first reduction transmission 14 is provided with a case 16, indicated in broken lines in FIG. 1. The first reduction transmission 14 also comprises at least one output module 18, in this case two output modules 18 that are identical. Hereafter, a single output module will be described.

Each output module 18 has an output pinion 20 and an output shaft 22, defining an output axis Y-Y. Each output module 18 is housed in the case 16 rotated around the output axis Y-Y. The removal direction R is oriented away from the motor 12.

Each output pinion 20 meshes with the gear ring 10. Each output pinion 20 has helical teeth.

Each output module 18 can be inserted in a single piece into the case 16 in an insertion direction I and/or removed in a single piece from that case 16 in a removal direction R. The insertion direction I and the removal direction R are opposite directions and extend parallel to the output axis Y-Y. The removal direction R is oriented away from the motor 12.

In order to facilitate the removal or insertion, and given that the gear ring 10 and the output pinion 20 have helical teeth, the driving device 6 comprises disconnectable connecting means 24 for each output module 18. These disconnectable connecting means 24 are suitable for rotatably connecting the output shaft 22 to a transmission element 26. The disconnectable connecting means 24 have a connected state and a disconnected state. In the connected state, the output shaft 22 is secured in rotation to the transmission element 26. In the disconnected state, the disconnectable connecting means 24 allow a rotation of the output pinion 20 around the output axis and relative to the transmission element 26, during removal of the output module 18 from the case 16 or during insertion of the output module into the case 16.

The transmission element 26 is a rotary element that is situated upstream of the disconnectable connecting means 24, which is driven by the motor 12 and transmits the rotation caused by the motor 12 to the disconnectable connecting means 24. In particular, the transmission element 26 is situated directly upstream from the disconnectable connecting means 24.

The transmission element 26 is, in the present case, the toothed output wheel 28 supported by the output shaft 22.

Figure 7:
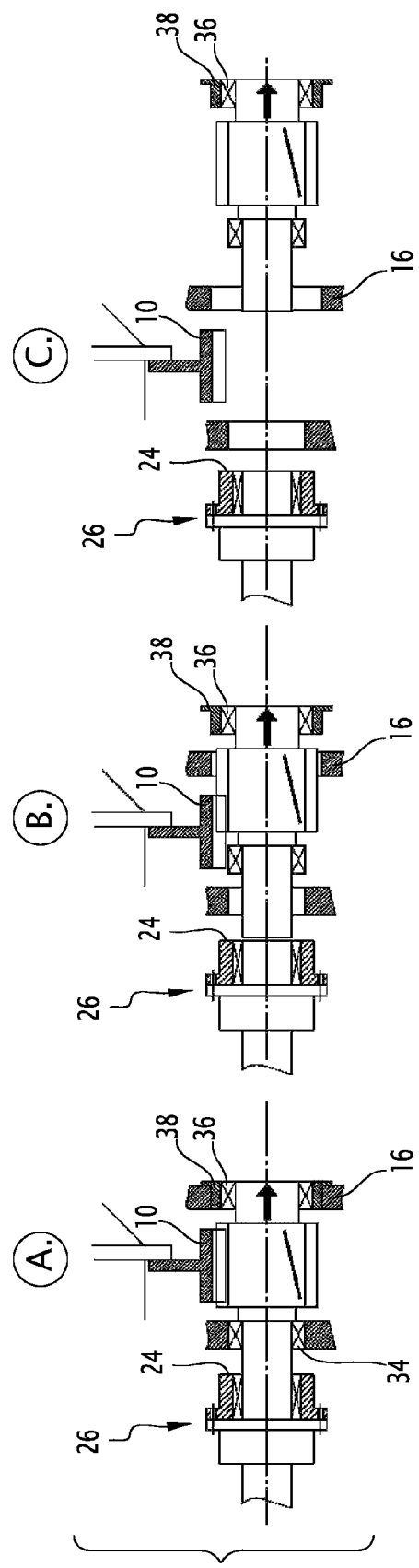
FIGS. 7A to 7C show the steps of disassembling a driving device according to a third alternative of the invention.

Alternatively, the transmission element 26 can be another output element arranged on the output shaft such as an output flange (FIG. 7).

The toothed output wheel 28 is in this case a toothed output wheel with helical teeth.

Figure 5:
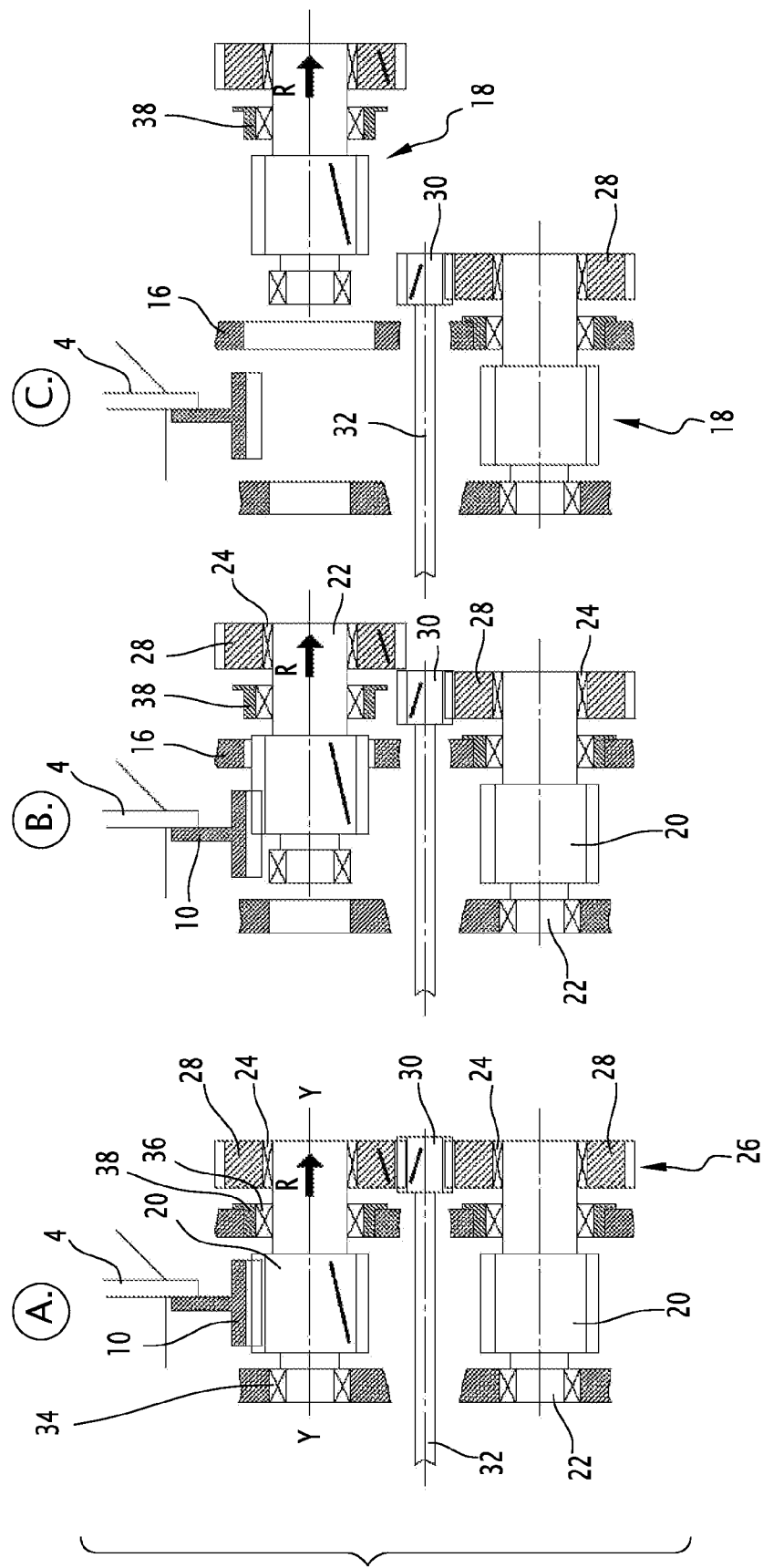
FIGS. 5A to 5C show steps of disassembling a driving device according to a first alternative of the invention.

FIG. 5 shows the reduction transmission 14 in more detail. The disconnectable connecting means 24 are a connection arranged between the toothed output wheel 28 and the output shaft 22. The transmission element 26, therefore the toothed output wheel 28, is axially fixed on the output shaft 22, even when the disconnectable connecting means 24 are disconnected.

The disconnectable connecting means 24 can be cooperating conical surfaces arranged on the output shaft 22 and the output wheel 28.

The connecting means 24 may also be a shrink disc or an assembly disc. These connecting means may also be an expandable assembler.

One can see that the first reduction transmission 14 also comprises a connecting pinion 30 and a connecting shaft 32. The motor shaft of the motor 12 is fixed directly, i.e., without a speed reducer, to the connecting shaft 32, for example using only a gear coupling.

The connecting pinion 30 simultaneously meshes with both of the toothed output wheels 28 of the first reduction transmission 14.

The transmission element 26, in the present case the toothed output wheel 28, and the first motor 12 are arranged on two opposite axial sides of the gear ring 10. This allows a compact construction of the mill.

The output module 18 also comprises two bearings 34, 36, arranged on either side of the output pinion 20, as well as a guide bearing 38.

The outer diameter of the bearing 34 is such that that bearing 34 does not interfere with the gear ring 10 during removal.

The outer diameter of the guide bearing 38 is larger than the outer diameter of the output pinion 20 so as to prevent interference between the pinion and the case 16.

The disassembly method for the reducer of FIG. 5 comprises the following steps.

One starts from the configuration shown in FIG. 5A, in which the output module 18 is arranged in the case 16. Each output pinion 20 meshes with the gear ring 10 and each toothed output wheel 28 meshes with the connecting pinion 30. The disconnectable connecting means 24 are connected and rotatably fix the toothed output wheel 28 to the output shaft 22.

Next, the disconnectable connecting means 24 are disconnected. In that state, the toothed output wheel 28 remains axially stationary relative to the output axis Y-Y on the output shaft 22, but rotates freely around the output axis Y-Y around that output shaft 22, at least over an angular range corresponding to the differential angular rotation in light of the difference in helical pitch between the toothed wheel 28 and the output pinion 20 during the removal.

Next, the output module 18, which includes the toothed output wheel 28, is axially offset along the removal direction R. During that offset, the output pinion rotates around the output axis Y-Y under the effect of the helical teeth of the output pinion 20 and the gear ring 10.

Then, the toothed output wheel 28 is released from the connecting pinion 30 (FIG. 5B). The offset in the removal direction R is continued until the output module 18 is completely outside the case 16, the output pinion 20 being completely freed from the gear ring 10 (FIG. 5C).

According to a first case, each output pinion 20 and the toothed wheels 28 have identical helical pitches. In that case, at least each output module 18, except one, includes disconnectable connecting means 24. In that case, these disconnectable connecting means 24 are used to adjust the angular position of the teeth relative to each other. The output modules can be axially disassembled owing to the identity of the helical pitches.

According to a second case, each output pinion 20 and the toothed wheels 28 have different helical pitches. In that case, each output module 18 includes disconnectable connecting means 24. In that case, these disconnectable connecting means 24 can be used to adjust the angular position of the teeth relative to one another. The output modules can be axially disassembled owing to the disconnectable connecting means 24.

Figure 2:
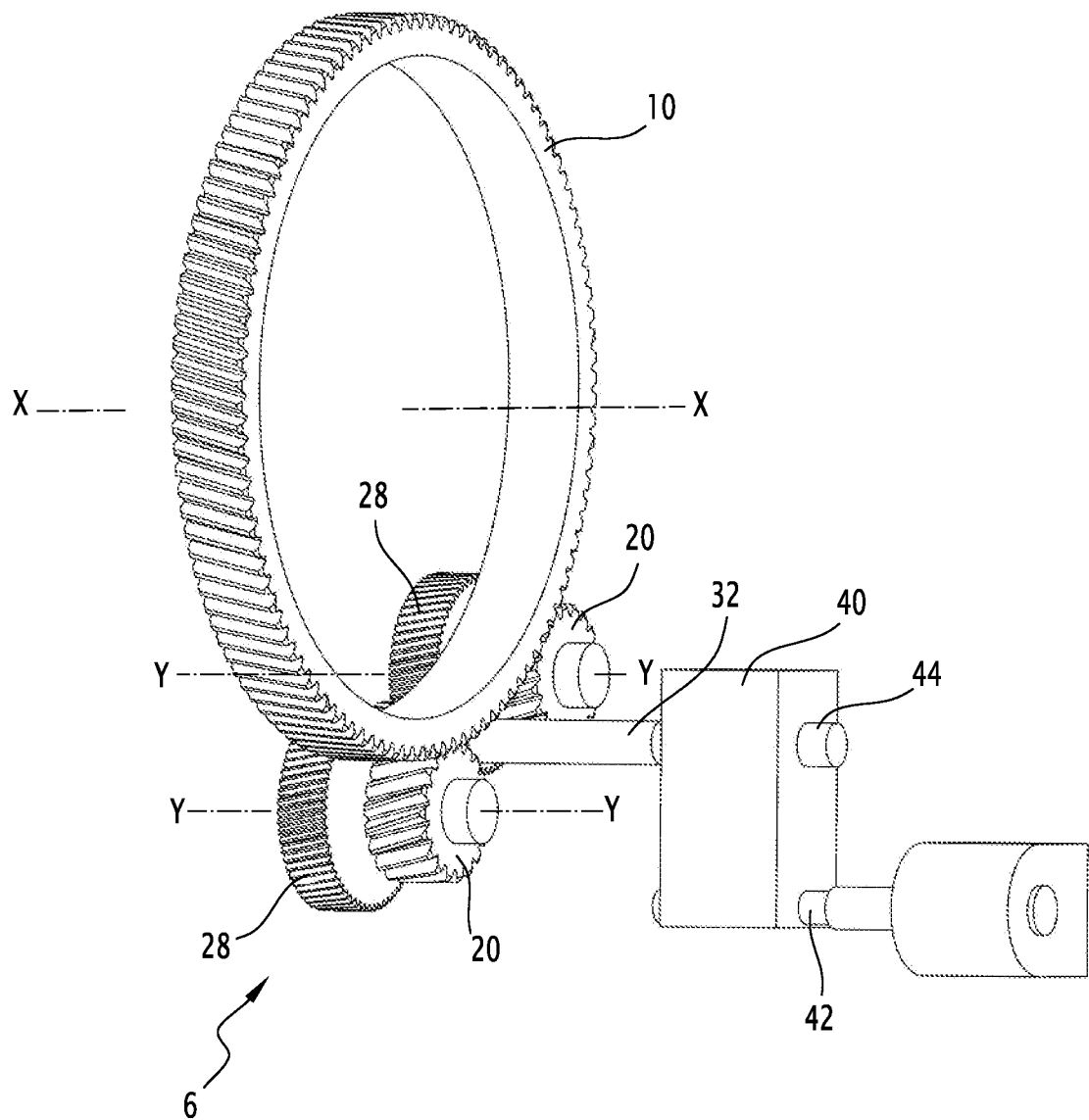
FIGS. 2, 3 and 4 are views similar to the view of FIG. 1 of a mill according to second, third and fourth embodiments of the invention.

FIG. 2 shows a driving device according to a second embodiment, which differs from that of FIG. 1 only as described below. Similar elements bear the same references.

The first motor 12 is connected to the connecting shaft 32 not directly, but by means of a first intermediate reduction transmission 40. The intermediate reduction transmission 40 comprises an input shaft 42 and a reduction transmission output shaft 44 that are radially offset relative to one another. Thus, the connecting shaft 32 and the motor shaft are radially offset relative to one another.

The first intermediate reduction transmission 40 imparts great flexibility to the mill 2 and makes it possible to adopt the position of the motor 12 to any space constraints that may exist. Furthermore, the first intermediate reduction transmission 40 makes it possible to adapt the speed of the motor 12 to a rated speed of the output pinions.

Figure 3:
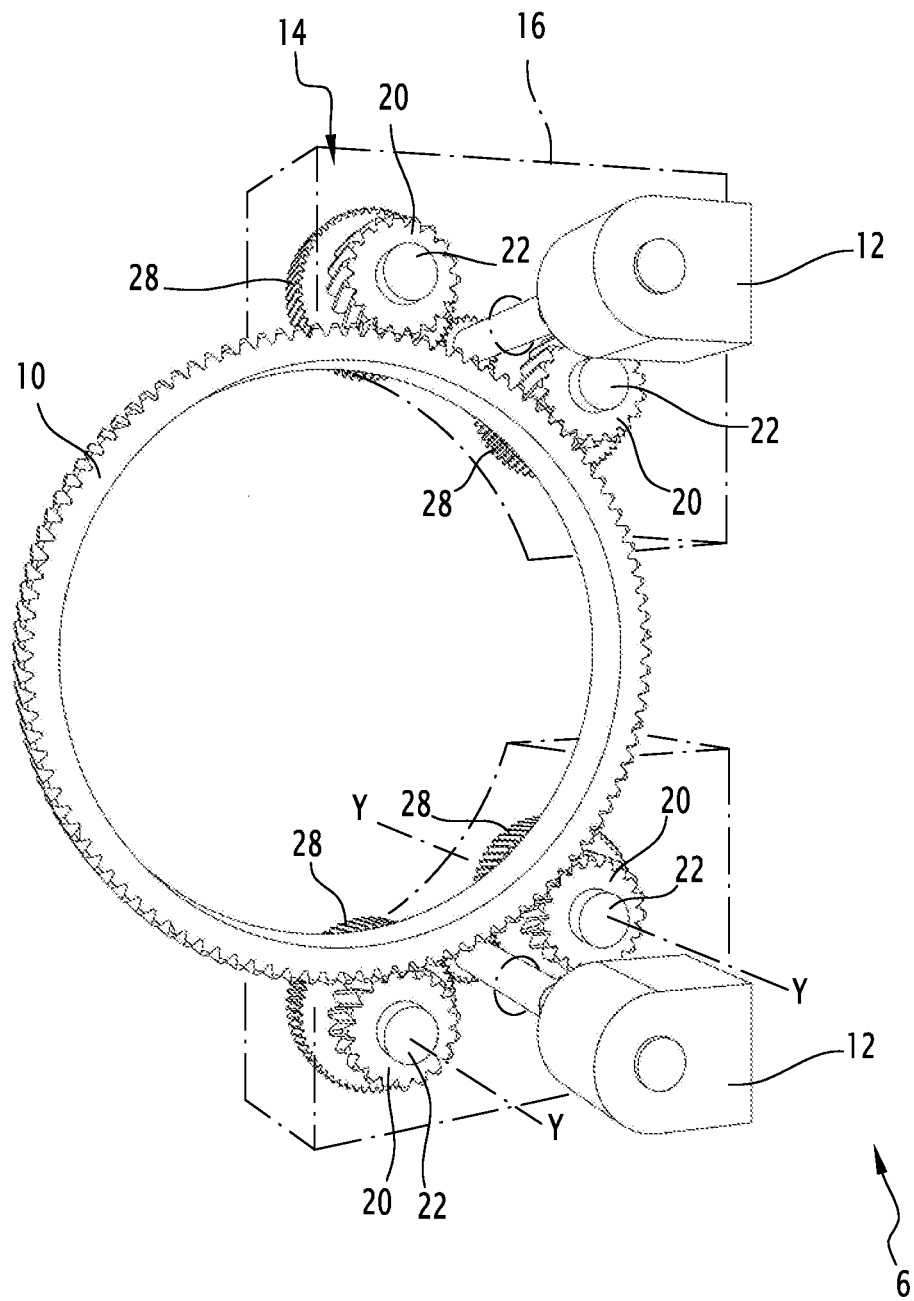

FIG. 3 shows a third embodiment of the driving device according to the invention. This driving device differs from the driving device of FIG. 1 only as described below. Similar elements bear the same references.

The driving device 6 includes a first motor 12, a first reduction transmission 14, and a second motor 12 and second reduction transmission 14. The second motor 12 and the second reduction transmission 14 have the same characteristics as the first motor 12 and the first reduction transmission 14 described above.

The driving device therefore has four output pinions 20, at least two of which are associated with a reduction transmission 14 and driven by a motor 12 each time.

This embodiment makes it possible to accumulate the power of the motors at the gear ring 10.

Figure 4:
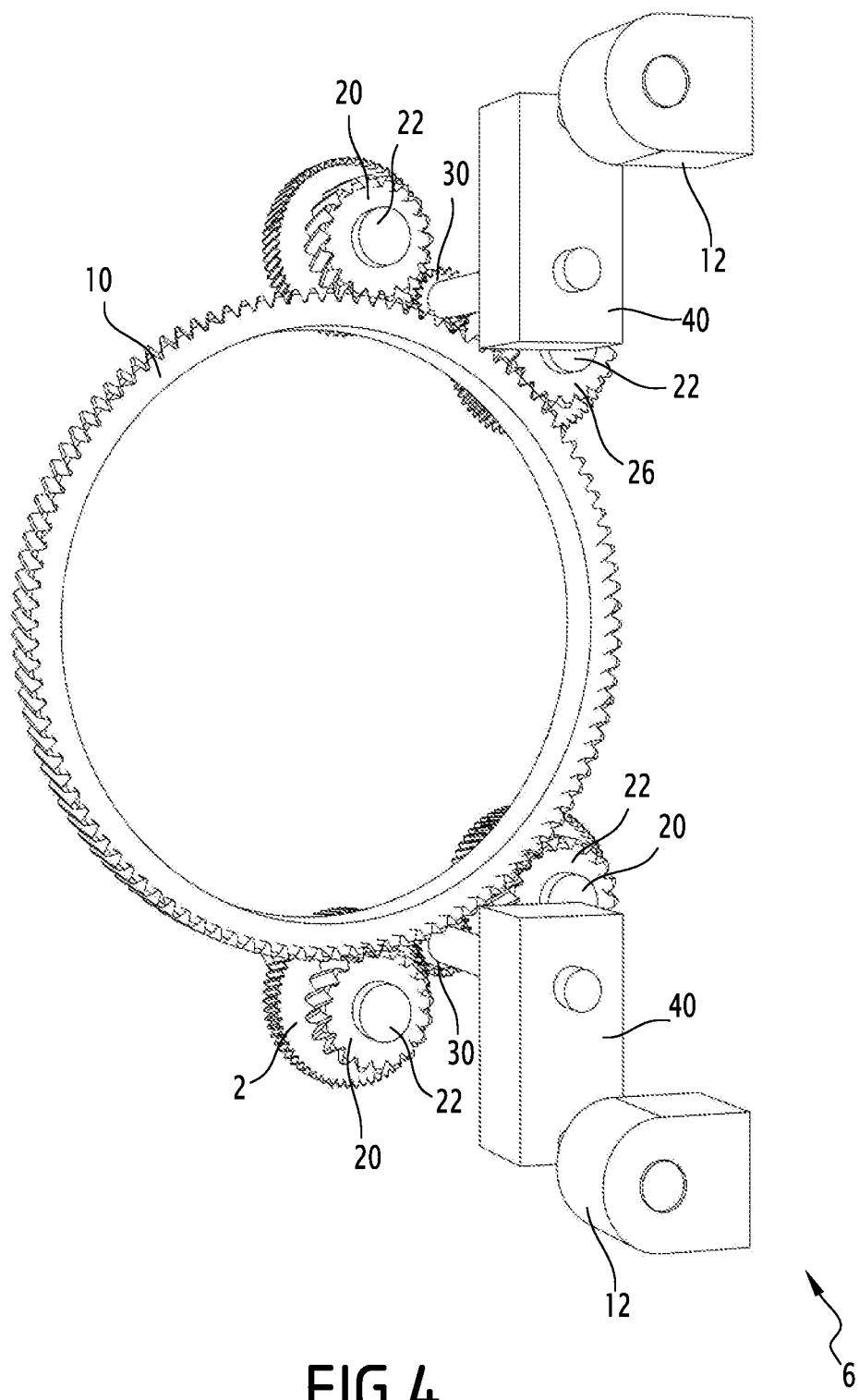

FIG. 4 shows a fourth embodiment of the driving device according to the invention. This driving device 6 differs from that of FIG. 2 only as described below. Similar elements bear the same references.

This driving device 6 includes a second reduction transmission 14 and a second motor 12 as well as a second intermediate reduction transmission 40. The second motor 12, the second reduction transmission 14 and the second intermediate reduction transmission 40 have the same characteristics as the first motor 12, the first reduction transmission 14 and the first intermediate reduction transmission 40 described above.

Figure 6:
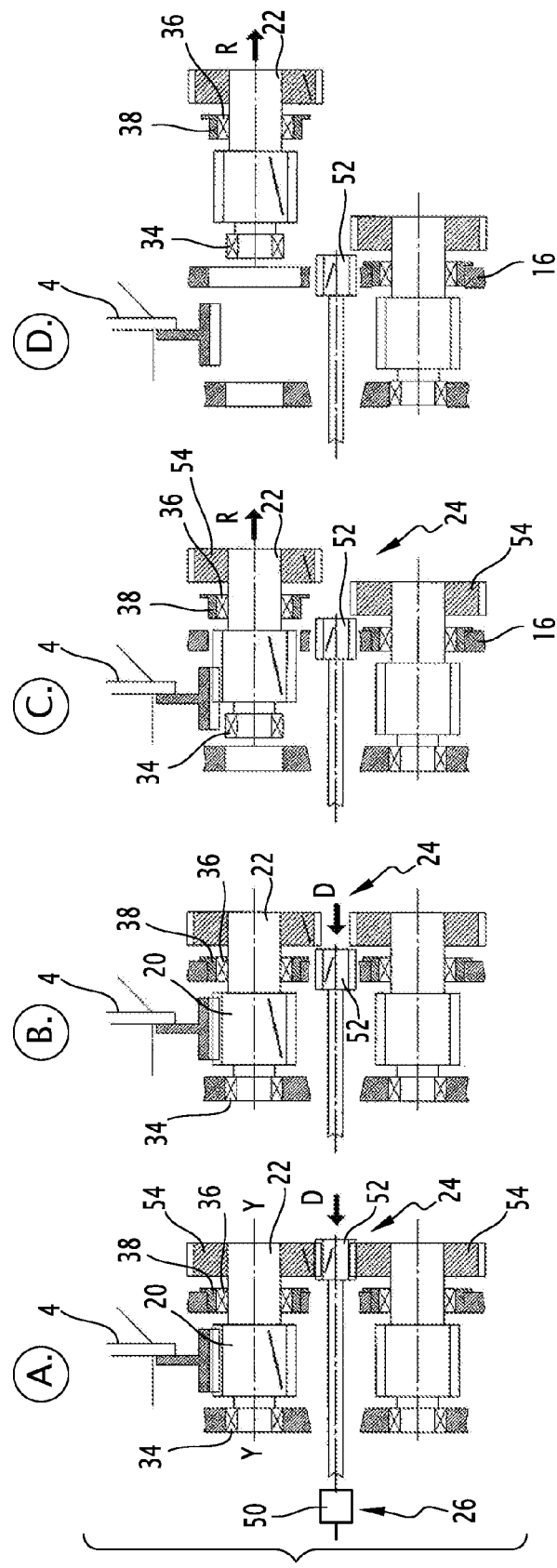
FIGS. 6A to 6D show the steps of disassembling a driving device according to a second alternative of the invention.

FIG. 6 shows the detail of a first reduction transmission 14 according to a second alternative of the invention. This alternative differs from the first reduction transmission 14 described above only as described below. Similar elements bear the same references.

The transmission element 26 is a releasable intermediate element 50 arranged between the motor 12 and the disconnectable connecting means 24. The disconnectable connecting means 24 comprise a connecting pinion 52 and a toothed connecting wheel 54. The toothed connecting wheel 54 is axially and radially fixed on the output shaft 22, both when the disconnectable connecting means 24 are in the connected state and when the disconnectable connecting means 24 are in the disconnected state.

The connecting pinion 52 is movable in a disconnecting direction D between a connected position, in which it meshes with the or each toothed connecting wheel 54, and a disconnected position, in which it is not in contact with the toothed connecting wheels 54 (see FIG. 6B). The disconnecting direction D is oriented toward the drive motor 12 associated with that connecting pinion 52. Alternatively, the disconnecting direction is oriented opposite the drive motor 12 associated with the connecting pinion 52.

The driving device 6 is disassembled as follows.

One starts from the configuration shown in FIG. 6A, which shows the disconnectable connecting means 24 in the connected state. The connecting pinion 52 meshes with each toothed connecting wheel 54. The transmission element 26 connects the connecting pinion 52 to the motor 12.

The intermediate element 50 is first released, also allowing an axial shift at the connecting pinion 52 toward its disconnected position (see FIG. 6B).

Then, the output module 18, comprising the output pinion 20, the output shaft 22, the bearings 34, 36, the guide bearing 38 and the toothed connecting wheel 54, is axially offset in the removal direction R until the output pinion 20 is not in contact with gear ring 10. During this removal, the fact that the toothed connecting wheel 54 is not in contact with the connecting pinion 52 allows the output module 18 to rotate around the output axis Y-Y under the effect of the helical teeth of the gear ring 10 and the output pinion 20 (see FIG. 6C).

Then, the output module 18 can be removed completely from the case 16.

This alternative has the advantage that a single disconnectable connecting means 24 is necessary for the two output pinions 20.

FIG. 7 shows a third alternative of a driving device according to the invention. This device differs from that shown in FIG. 5 as described below, similar elements bearing the same references.

The transmission element 26 is an output element arranged on the output shaft 22, in this case an output flange 60. The output flange 60 is connected by the disconnectable connecting means 24 to the output shaft 22.

The transmission element 26 and the associated drive motor 12 are arranged on a same axial side of the gear ring 10.

The transmission element 26 can be connected to the drive motor 12 using an intermediate reduction transmission (not shown). This intermediate reduction transmission includes a single connecting pinion and, for each output pinion 20, a toothed connecting wheel, similarly to the connecting pinion 52 and the toothed connecting wheels 54 of FIG. 6. The intermediate reduction transmission is arranged in an additional case, separate from the case 16.

FIG. 8 shows a fourth alternative of a driving device according to the invention. This alternative differs from the alternative of FIG. 7 only as described below. Similar elements bear the same references.

The transmission element 26 is a transmission flange 60 permanently fixed in rotation relative to the motor 12.

The disconnectable connecting means 24 comprise a spacer 70 and an output flange 72. The output flange 72 is permanently fixed to the output shaft 22.

The spacer 70 has an axial length L that is at least equal to the distance necessary to remove the output module 18 axially from the case 16. In the present case, the spacer 70 has an axial length that is at least the axial length of the output module.

The driving device 6 according to the fourth alternative is disassembled as follows.

First, the connections between the spacer 70 and the transmission element 26 and the output flange 72 are released (FIG. 8A).

Then, the spacer 70 is removed between the transmission element 26 and the output flange 72. This removal is done radially relative to the output axis Y-Y (FIG. 8B).

Next, the output module 18, including at least the output pinion 20, the output shaft 22 and the output flange 72, is removed from the case 16 in the removal direction R (FIG. 8C/D).

The driving device according to the invention has the following advantages:

The reduction transmission allows rapid disassembly of an output pinion.

During the removal/insertion of the output module, it is not necessary to disassemble or move the case.

The removal does not upset the output module or the meshing of the output pinion and the gear ring.

The operators require only a basic qualification; a qualification as a maintenance technician suffices.

No separation other than that of the disconnectable connecting means 24 is necessary (motor as primary reduction transmission).

The operating time for a removal and insertion of the output modules is short (<24 h).

The removal/insertion does not require heavy tools or lifting means. The size to be moved is that of a subassembly, compared to the size of a complete reduction transmission of the existing solutions.

Each transmission pinion can be disassembled independently of the others.

While the foregoing is directed to embodiments of the present invention, other and further embodiments of the invention may be devised without departing from the basic scope thereof, and the scope thereof is determined by the claims that follow.

The invention claimed is:

1. A driving device for a horizontal mill comprising:
a gear ring suitable for being fastened to a grinding chamber and extending around a ring axis; and
a first reduction transmission suitable for transmitting a rotation from a first motor to the gear ring, the first reduction transmission comprising:
  a case;
  at least two output modules, wherein each output module comprises:
    an output pinion; and
    an output shaft defining an output axis, each output pinion meshing with the gear ring, wherein the gear ring has helical teeth, each output pinion has helical teeth, each output module can be inserted as a single unit into the case in an insertion direction or removed as a single unit from the case in a removal direction, and the insertion direction and the removal direction extend parallel to the output axis; and
  for at least one output module, disconnectable connecting means suitable for rotatably connecting the output shaft to a transmission element and allowing, in a disconnected state, a rotation of the output pinion around the output axis upon removal of the output module outside the case or during insertion of the output module into the case.

2. The driving device according to claim 1, wherein the transmission element is an output element arranged on the output shaft, and the output element is a toothed output wheel or an output flange.

3. The mill according to claim 2, wherein the output element is a toothed output wheel having helical teeth.

4. The driving device according to claim 2, wherein the transmission element is axially fixed on the output shaft when the disconnectable connecting means are in the disconnected state.

5. The driving device according to claim 2, wherein each transmission element is a toothed output wheel and wherein either the driving device comprises, for each output module except one, disconnectable connecting means suitable for rotatably connecting the output shaft to the toothed output wheel and allowing, in the disconnected state, a rotation of the output pinion around the output axis during removal of the output module from the case or during insertion of the output module in the case, and the output pinion and the toothed output wheel of the output module that does not include disconnectable connecting means have identical helical pitches,
or the driving device comprises, for each output module, disconnectable connecting means suitable for rotatably connecting the output shaft to the toothed output wheel and allowing, in the disconnected state, a rotation of the output pinion around the output axis during removal of the output module from the case or during insertion of the output module in the case, and the output pinion and toothed output wheel have different helical pitches.

6. The driving device according to claim 1, wherein the transmission element is an intermediate element, and wherein the disconnectable connecting means comprise a connecting pinion and a toothed connecting wheel, the connecting pinion being movable between a connected position and a disconnected position.

7. The driving device according to claim 1, wherein the transmission element is a transmission flange and the disconnectable connecting means comprise a spacer and an output flange fastened to the output shaft, the spacer having an axial length that is at least equal to the axial distance necessary to remove the output module axially from the case.

8. The mill according to claim 7, wherein the axial length of the spacer at least the axial length of the output module.

9. The driving device according to claim 1, further comprising a first drive motor connected to the first reduction transmission, and wherein the transmission element and the motor are either arranged on two opposite axial sides of the gear ring, or arranged on a same axial side of the gear ring.

10. The driving device for a mill according to claim 1, further comprising a second reduction transmission and a second drive motor, wherein the second reduction transmission comprising:
a case;
at least two output modules, wherein each output module comprises:
  an output pinion; and
  an output shaft defining an output axis, wherein each output pinion meshing with the gear ring, the gear ring has helical teeth, each output pinion has helical teeth, each output module can be inserted as a single unit into the case in an insertion direction or removed as a single unit from the case in a removal direction, and the insertion direction and the removal direction extend parallel to the output axis; and
for at least one output module of the second reduction transmission, disconnectable connecting means suitable for rotatably connecting the output shaft to a transmission element and allowing, in a disconnected state, a rotation of the output pinion around the output axis upon removal of the output module outside the case or during insertion of the output module into the case.

11. A horizontal mill, having a grinding chamber and a driving device, the mill comprising:
a gear ring suitable for being fastened to the grinding chamber and extending around a ring axis; and
a first reduction transmission suitable for transmitting a rotation from a first motor to the gear ring, the first reduction transmission comprising:

a case;
at least two output modules, wherein each output module comprises:
an output pinion; and
an output shaft defining an output axis, each output pinion meshing with the gear ring, wherein the gear ring has helical teeth, each output pinion has helical teeth, each output module can be inserted as a single unit into the case in an insertion direction or removed as a single unit from that associated case in a removal direction, the insertion direction and the removal direction extend parallel to the output axis; and
for at least one output module, disconnectable connecting means suitable for rotatably connecting the output shaft to a transmission element and allowing, in a disconnected state, a rotation of the output pinion around the output axis upon removal of the output module outside the case or during insertion of the output module into the case.

12. The mill according to claim 11, wherein the transmission element is an output element arranged on the output shaft, and the output element is a toothed output wheel or an output flange.

13. The mill according to claim 12, wherein the output element is a toothed output wheel having helical teeth.

14. The mill according to claim 12, wherein the transmission element is axially fixed on the output shaft when the disconnectable connecting means are in the disconnected state.

15. The mill according to claim 12, wherein each transmission element is a toothed output wheel and wherein
either the driving device comprises, for each output module except one, disconnectable connecting means suitable for rotatably connecting the output shaft to the toothed output wheel and allowing, in the disconnected state, a rotation of the output pinion around the output axis during removal of the output module from the case or during insertion of the output module in the case, and the output pinion and the toothed output wheel of the output module that does not include disconnectable connecting means have identical helical pitches,
or the driving device comprises, for each output module, disconnectable connecting means suitable for rotatably connecting the output shaft to the toothed output wheel and allowing, in the disconnected state, a rotation of the output pinion around the output axis during removal of the output module from the case or during insertion of the output module in the case, and the output pinion and toothed output wheel have different helical pitches.

16. The mill according to claim 11, wherein the transmission element is an intermediate element, and wherein the disconnectable connecting means comprise a connecting pinion and a toothed connecting wheel, the connecting pinion being movable between a connected position and a disconnected position.

17. The mill according to claim 11, wherein the transmission element is a transmission flange and the disconnectable connecting means comprise a spacer and an output flange fastened to the output shaft, the spacer having an axial length that is at least equal to the axial distance necessary to remove the output module axially from the case.

18. The mill according to claim 17, wherein the axial length of the spacer at least the axial length of the output module.

19. The mill according to claim 11, wherein the driving device further comprises a first drive motor connected to the first reduction transmission, and wherein the transmission element and the motor are either arranged on two opposite axial sides of the gear ring, or arranged on a same axial side of the gear ring.

20. The mill according to claim 11, wherein the driving device further comprises a second reduction transmission and a second drive motor.

* * * * *